(12) United States Patent
Yen

(10) Patent No.: US 12,354,317 B2
(45) Date of Patent: Jul. 8, 2025

(54) IMAGE RECOGNITION METHOD, ELECTRONIC DEVICE AND STORAGE MEDIUM

(71) Applicant: HON HAI PRECISION INDUSTRY CO., LTD., New Taipei (TW)

(72) Inventor: Chien-Wu Yen, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 398 days.

(21) Appl. No.: 18/108,779

(22) Filed: Feb. 13, 2023

(65) Prior Publication Data
US 2024/0144633 A1 May 2, 2024

(30) Foreign Application Priority Data
Oct. 26, 2022 (CN) .......................... 202211320969.8

(51) Int. Cl.
*G06V 10/25* (2022.01)
*G06T 7/10* (2017.01)
*G06V 10/44* (2022.01)

(52) U.S. Cl.
CPC .............. *G06V 10/25* (2022.01); *G06T 7/10* (2017.01); *G06V 10/44* (2022.01);
(Continued)

(58) Field of Classification Search
CPC ........... G06T 2207/20081; G06T 2207/20084; G06V 10/454; G06V 10/82; G06V 10/774; G06V 10/25; G06V 10/44; G06V 2201/07; G06V 10/764; G06V 10/26; G06V 10/77; G06V 10/759
See application file for complete search history.

(56) References Cited

U.S. PATENT DOCUMENTS

| | | | | |
|---|---|---|---|---|
| 2020/0117991 A1* | 4/2020 | Suzuki | ................... | G06N 3/045 |
| 2023/0196117 A1* | 6/2023 | Du | ........................ | G06F 18/214 |
| | | | | 382/155 |

(Continued)

FOREIGN PATENT DOCUMENTS

| | | | | |
|---|---|---|---|---|
| CN | 108960189 | | 11/2020 | |
| CN | 109189767 B | * | 7/2021 | ........... G06K 9/6256 |

(Continued)

*Primary Examiner* — Sumati Lefkowitz
*Assistant Examiner* — Connor L Hansen
(74) *Attorney, Agent, or Firm* — ScienBiziP, P.C.

(57) ABSTRACT

An image recognition method applied to an electronic device is provided. The method includes obtaining a recognition region and a plurality of test regions. A plurality of first prediction results is obtained by predicting each of the plurality of test regions using a first recognition model. A prediction accuracy rate is calculated. A plurality of target regions is obtained from the plurality of test regions, and a second recognition model is obtained by adjusting the first recognition model based on the prediction accuracy rate and the plurality of target regions. An initial feature matrix is obtained by inputting the recognition region in the second recognition model. A target vector is generated according to a target feature matrix and an initial weight matrix; and a recognition result of the image to be recognized is obtained by inputting the target vector into the second recognition model.

20 Claims, 3 Drawing Sheets

(52) U.S. Cl.
CPC .............. *G06T 2207/20081* (2013.01); *G06T 2207/20084* (2013.01); *G06V 2201/07* (2022.01)

(56) References Cited

U.S. PATENT DOCUMENTS

2023/0316532 A1* 10/2023 Yoo ..................... A61B 6/032
　　　　　　　　　　　　　　　　　　　382/128
2024/0232286 A9* 7/2024 Lin ..................... G06F 7/5443

FOREIGN PATENT DOCUMENTS

| CN | 108388876 | 4/2022 |
|----|-----------|--------|
| TW | 746674 | 11/2021 |

\* cited by examiner

IMAGE RECOGNITION METHOD, ELECTRONIC DEVICE AND STORAGE MEDIUM

FIELD

The present disclosure relates to image processing technology, in particular to an image recognition method, an electronic device, and a storage medium.

BACKGROUND

In the current image recognition technology, an inconsistency of dimensions of an operation matrix in a fully connected layer leads to a complicated operation process, resulting in a low accuracy of recognition and a slow speed of recognition. Therefore, speeding up image recognition while ensuring accuracy of recognition is a problematic.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
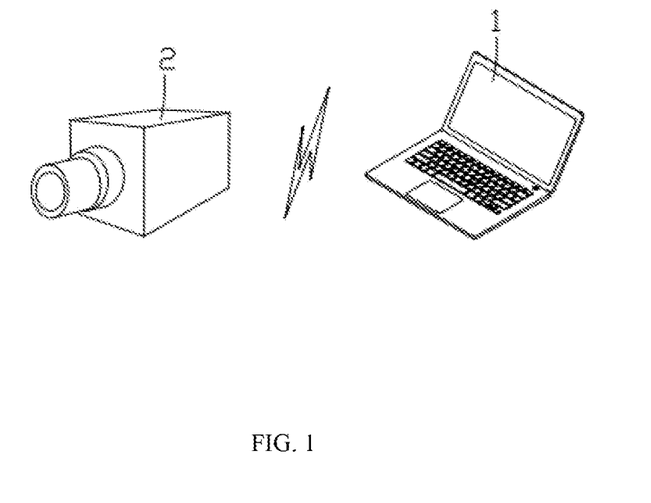
FIG. 1 is an application environment diagram of one embodiment of an image recognition method of the present disclosure.

FIG. 1 is an application environment diagram of one embodiment of an image recognition method of the present disclosure. The image recognition method can be applied to one or more electronic devices 1. The one or more electronic devices 1 can communicate with a camera device 2, and the camera device 2 may be a camera or other device for capturing images. For example, the camera device 2 can take an image of an object to be recognized and obtain the image of the object (hereinafter "image to be recognized"). The object to be recognized may be an animal such as a cat, a dog, or a plant such as a flower or a tree.

The electronic device 1 is a device that can automatically perform numerical calculation and/or information processing according to pre-set or stored instructions, and its hardware includes, but is not limited to, a microprocessor, an application specific integrated circuit (ASIC), a field-programmable gate array (FPGA), a digital signal processor (DSP), an embedded equipment, and so on.

The electronic device 1 can be any electronic product that can interact with a user. For example, the electronic device 1 can be a personal computer, a tablet computer, a smart phone, a personal digital assistant (PDA), a game console, and an internet protocol television (IPTV), a smart wearable device, etc.

The electronic device 1 may also include network equipment and/or user equipment. Wherein, the network device includes, but is not limited to, a network server, a server group formed by a plurality of network servers, or a cloud formed by a large number of hosts or network servers based on cloud computing.

The network where the electronic device 1 is located can include, but is not limited to, the Internet, a wide area network, a metropolitan area network, a local area network, a virtual private network (VPN), and the like.

Figure 2:
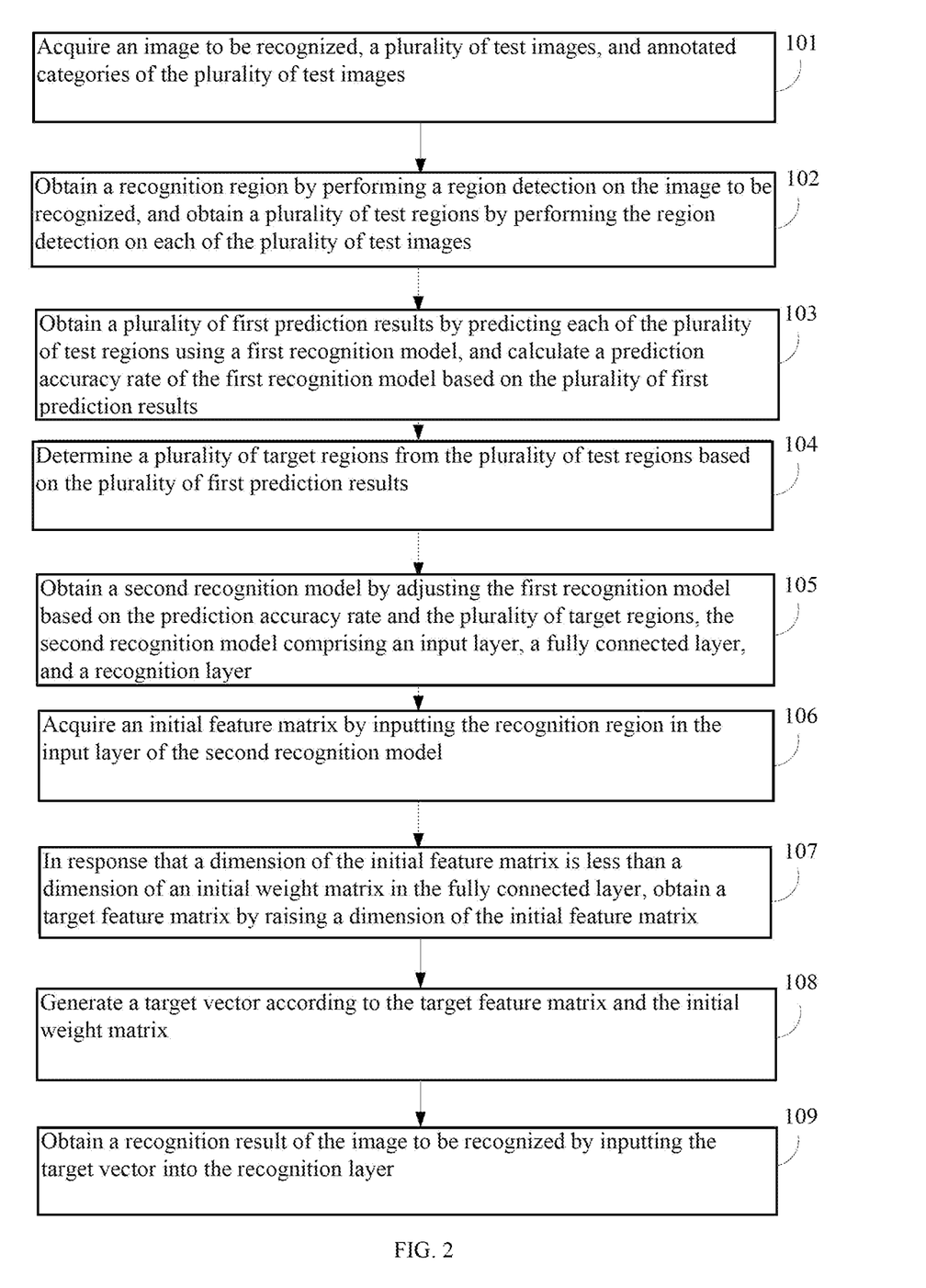
FIG. 2 is a flowchart of one embodiment of the image recognition method of the present disclosure.

FIG. 2 is a flowchart of one embodiment of an image recognition method of the present disclosure According to different requirements, a sequence of each block in this flowchart can be adjusted according to actual requirements, and some blocks can be omitted. The execution body of this method can be an electronic device, such as an electronic device 1 shown in FIG. 4.

101, the electronic device acquires an image to be recognized, a plurality of test images, and annotated categories of the plurality of test images.

In at least one embodiment of the present disclosure, the image to be recognized refers to an image of which a category of an object that needs to be recognized.

In at least one embodiment of the present disclosure, each of the plurality of test images refers to an image of which a category of one or more target objects have been annotated.

In at least one embodiment of the present disclosure, each of the annotated categories refers to a category of a target object. It can be understood the plurality of test images may refer to various kinds of target objects such that various kinds of categories are included. For example, when the target objects are cats, dogs, birds, and plants, the annotated categories include cats, dogs, birds, etc., and the plurality of test images may be images including animals (e.g., puppies, kittens, etc.), plants (e.g., flowers), trees, etc. and many other kinds of objects.

In at least one embodiment of the present disclosure, the acquiring of the image to be recognized includes:

Obtaining the image to be recognized by controlling the camera device to capture an image of an object to be recognized.

Wherein, the object to be recognized may be an animal such as a cat or a dog, or may be a flower or a plant.

In at least one embodiment of the present disclosure, the electronic device acquires the plurality of test images and the annotated categories of the plurality of test images from a first database. The first database may be a database such as CIFAR, ImageNet, and Kaggle.

102, the electronic device obtains a recognition region by performing a region detection on the image to be recognized, and obtains a plurality of test regions by performing the region detection on each of the plurality of test images.

In at least one embodiment of the present disclosure, the recognition region refers to a region which includes the object to be recognized in the image to be recognized.

In at least one embodiment of the present disclosure, the test region refers to a region which includes a target object.

In at least one embodiment of the present disclosure, the obtaining of the recognition region by performing the region detection on the image to be recognized includes:

Obtaining a characteristic image by performing an equalization and normalization processing on the image to be recognized; obtaining a target position by detecting the characteristic image based on a target detection algorithm; and obtaining the recognition region by segmenting the characteristic image based on the target position.

The target detection algorithm includes, but is not limited to: R-CNN series algorithms, YOLO series algorithms and SSD algorithms.

By performing the equalization and normalization processing on the image to be recognized and each of the plurality of test images, a brightness of the image to be recognized and a brightness of each of the plurality of test images can be made more uniform, so that the recognition region can better reflect a true color of the object to be recognized and the test region can better reflect a true color of the target object, and through the segmentation operation, a range of feature extraction can be reduced, thereby speeding up a speed of feature extraction.

103, the electronic device obtains a plurality of first prediction results by predicting each of the plurality of test regions using a first recognition model, and calculates a prediction accuracy rate of the first recognition model based on the plurality of first prediction results.

In at least one embodiment of the present disclosure, the first recognition model refers to a model obtained by training a convolutional neural network using images (hereinafter "training images"), and the first recognition model can be used to recognize the category of the target object in each of the plurality of test regions.

In at least one embodiment of the present disclosure, each of the plurality of first prediction results includes a category (hereinafter referred to "predicted category") of the target object obtained by the first recognition model recognizing the each of the plurality of test regions.

In at least one embodiment of the present disclosure, the prediction accuracy rate refers to a ratio of correct prediction results in all of the plurality of first prediction results.

In at least one embodiment of the present disclosure, before calculating the prediction accuracy rate of the first recognition model based on the plurality of first prediction results, the electronic device further:

Acquires a plurality of training images; obtaining a plurality of training regions by detecting each of the plurality of training images; and obtains the first recognition model by performing an iterative training on a convolutional neural network based on the plurality of training regions.

Wherein, the plurality of training images refers to images containing objects intended for training (hereinafter referred to as "training objects"), and the training objects can be animals such as cats and dogs, flowers and plants. It can be understood that in order to improve a prediction ability of the first recognition model, there should be as many categories as possible of training objects. In addition, the plurality of training images can also be obtained from the first database.

The convolutional neural network includes a plurality of layers. The plurality of layers includes a convolutional layer, a pooling layer, an activation function layer, a flattening layer, a fully connected layer, etc. The convolutional neural network can be a VGG network, a ResNet network, a LeNet network, and the like.

In this embodiment, a process of obtaining the plurality of regions for training (hereinafter referred to as "training regions") is basically the same as a process of obtaining the plurality of test regions, so the present disclosure will not repeat them here.

Through the above-mentioned implementation, each of the plurality of training regions is divided from a corresponding training image, and the convolutional neural network is trained by using the plurality of training regions. Since a region of each of the plurality of training images is reduced, a speed of extracting features in the training process can be improved.

Specifically, the obtaining of the first recognition model by performing the iterative training on the convolutional neural network based on the plurality of training regions includes:

Setting a batch size and a learning rate of the convolutional neural network, and setting a number of iterations of the convolutional neural network; obtaining a plurality of second prediction results by predicting each of the plurality of training regions using the convolutional neural network; calculating a loss value of the convolutional neural network according to the plurality of second prediction results; and obtaining the first recognition model by performing a gradient backpropagation on the convolutional neural network based on the loss value, until the loss value is decreased to a minimum value.

Wherein, in the embodiment of the present disclosure, the loss value is calculated based on a cross-entropy loss function.

For example, if the convolutional neural network is a VGG16 network, the electronic device sets the batch size of the convolutional neural network at 128, sets the learning rate of the convolutional neural network at 0.1, and sets the number of iterations of the convolutional neural network at 100. The electronic device obtains the plurality of second prediction results by predicting the plurality of training regions using the convolutional neural network, and calculates the loss value of the convolutional neural network according to the plurality of second prediction results, and obtains the first recognition model by performing the gradient backpropagation on the convolutional neural network based on the loss value until the loss value decreases to a minimum value.

Through the above-mentioned embodiment, a weight of the convolutional neural network can be updated by performing the gradient backpropagation on the convolutional neural network based on the loss value, so that the loss value will decrease faster, thereby improving a convergence rate of the convolutional neural network.

In at least one embodiment of the present disclosure, each of the plurality of first prediction results include a predicted category of a corresponding test region. The calculating of the prediction accuracy rate of the first recognition model based on the plurality of first prediction results includes:

Obtaining a plurality of feature regions by determining each test region corresponding to a predicted category that is same as the annotated category as a feature region; counting a first quantity of the plurality of feature regions and counting a second quantity of the plurality of test regions; determining the prediction accuracy rate of the first recognition model by calculating a ratio of the plurality of feature regions in the plurality of test regions according to the first quantity and the second quantity.

For example: if the first quantity equals 860 and the second quantity equals 1000, the ratio of the first quantity to the second quantity is calculated, and the prediction accuracy rate of the first recognition model is determined to be 0.86.

The prediction accuracy rate of the first recognition model for the plurality of test regions can be quickly and accurately calculated by using the first quantity and the second quantity.

104, the electronic device determines a plurality of target regions from the plurality of test regions based on the plurality of first prediction results, and obtaining a plurality of target categories by determining an annotated category corresponding to each of the plurality of target regions as a target category.

In at least one embodiment of the present disclosure, a target region refers to a test region corresponding to the correct prediction result.

In at least one embodiment of the present disclosure, each of the plurality of first prediction results further includes a first probability of each predicted category. The determining of the plurality of target regions from the plurality of test regions based on the plurality of first prediction results includes:

Determining each test region of which the first probability greater than a preset threshold as the target region.

Wherein, the preset threshold can be set according to requirements, which is not limited in the present disclosure.

Through the above embodiment, based on a comparison result between each first probability and the preset threshold, the target region corresponding to an annotated category can be screened out, so that a recognition accuracy of the target region can be controlled.

105, the electronic device obtains a second recognition model by adjusting the first recognition model based on the prediction accuracy rate and the plurality of target regions, the second recognition model includes an input layer, a fully connected layer, and a recognition layer.

In at least one embodiment of the present disclosure, the second recognition model refers to a model generated by adjusting the first recognition model using the plurality of target regions.

In at least one embodiment of the present disclosure, the obtaining of the second recognition model by adjusting the first recognition model based on the prediction accuracy rate and the plurality of target regions includes:

Counting a third total number of target areas that are corresponding to each annotated category; obtaining a plurality of enhanced areas by performing data enhancement on the target areas corresponding to the third total number being less than a first preset value; if the prediction accuracy rate is less than a second preset value, obtaining the second recognition model by inputting the plurality of enhanced regions into the first recognition model until the prediction accuracy rate is greater than or equal to the second preset value.

Wherein, the first preset value can be set according to requirements, which is not limited in the present disclosure.

The second preset value may be 0.8, 0.75, and the like.

By performing data enhancement on the target areas corresponding to each annotated category, it can be ensured that the number of samples used for adjusting the second recognition model is sufficient, thereby improving the prediction accuracy of the second recognition model.

106, the electronic device acquires an initial feature matrix by inputting the recognition region in the input layer of the second recognition model.

In at least one embodiment of the present disclosure, a sequence of a network structure in the second recognition model is: an input layer, a fully connected layer, and a recognition layer.

In this embodiment, when the input layer includes a plurality of hierarchical structures, the initial feature matrix may be obtained from a last hierarchical structure of the plurality of hierarchical structures.

Through the above implementation, it can be ensured that extracted features are more comprehensive and accurate.

The plurality of hierarchical structures may include a convolutional layer, an activation function layer, a pooling layer, a flattening layer, and a number of each of the plurality of hierarchical structures and an arrangement order of the plurality of hierarchical structures in each input layer can be flexibly adjusted.

In at least one embodiment of the present disclosure, the initial feature matrix refers to a matrix obtained by performing a feature extraction operation on the recognition region using the second recognition model.

107, if a dimension of the initial feature matrix is less than a dimension of an initial weight matrix in the fully connected layer, the electronic device obtains a target feature matrix by raising a dimension of the initial feature matrix.

In at least one embodiment of the present disclosure, the target feature matrix refers to a matrix of which a dimension is the same as that of the initial weight matrix.

In at least one embodiment of the present disclosure, the obtaining of the target feature matrix by raising the dimension of the initial feature matrix includes:

Counting a number of rows of the initial feature matrix and counting a number of columns of the initial feature matrix; obtaining a target product by multiplying the number of rows and the number of columns; obtaining a plurality of prime factors by decomposing the target product; combining any two same prime factors among the plurality of prime factors into a prime factor pair, and obtaining a plurality of prime factor pairs; obtaining a feature product by calculating a product of the two prime factors in each of the plurality of prime factor pairs, wherein each prime factor can only be combined once; selecting a plurality of target prime factor pairs from the plurality of prime factor pairs according to the target product and the feature product; obtaining a characteristic prime factor by extracting a prime factor from each of the plurality of target prime factor pairs; generating a characteristic value according to a logarithm of the plurality of target prime factor pairs and each characteristic prime factor; replacing each target prime factor pair with zero among the plurality of prime factors; obtaining a target value by multiplying all non-zero prime factors after completing a replacement of replacing each target prime factor pair with zero; obtaining the target feature matrix by raising the dimension of the initial feature matrix based on a configuration value, the target value and the characteristic value.

The target prime factor pair refers to a prime factor pair whose feature product is divisible by the target product, and the configuration value is a value of 1.

It can be understood that the target product is sufficiently large and non-prime to ensure that there must be at least two identical prime factors in the plurality of prime factors.

Specifically, the "generating a characteristic value according to a logarithm of the plurality of target prime factor pairs and each characteristic prime factor" includes:

If the logarithm of the plurality of target prime factor pairs is single, determining the characteristic prime factor as the characteristic value; if the logarithm of the plurality of target prime factor pairs is multiple, obtaining the characteristic value by multiplying the characteristic prime factors.

Specifically, the obtaining of the target feature matrix by performing the dimension raising processing on the initial feature matrix based on the configuration value, the target value, and the characteristic value includes:

Determining the configuration value as a batch size, determining the target value as a number of channels, and determining the characteristic value as the number of rows and the number of columns.

For example, the number of rows of the initial feature matrix is 1, and the number of columns of the initial feature matrix is 60, that is, the initial feature matrix is: [1 1 1 1 1 3 3 3 3 3 2 2 2 2 2 2 2 2 2 2 3 3 3 3 3 1 1 1 1 1 2 2 2 2 2 3 3 3 3 3 1 1 1 1 1 1 1 1 1 1 3 3 3 3 3 2 2 2 2 2].

The configuration value is 1, the target value calculated by the above method is 15, and the characteristic value is 2. Based on the configuration value 1, the target value 15, and the characteristic value 2, the dimension raising processing is performed on the initial characteristic matrix obtain the target feature matrix, wherein the target feature matrix is:

$$\left[\begin{bmatrix}1 & 1\\1 & 1\end{bmatrix},\begin{bmatrix}1 & 3\\3 & 3\end{bmatrix},\begin{bmatrix}3 & 3\\2 & 2\end{bmatrix},\begin{bmatrix}2 & 2\\2 & 2\end{bmatrix},\begin{bmatrix}2 & 2\\2 & 2\end{bmatrix},\begin{bmatrix}3 & 3\\3 & 3\end{bmatrix},\begin{bmatrix}3 & 1\\1 & 1\end{bmatrix},\right.$$
$$\left.\begin{bmatrix}1 & 1\\2 & 2\end{bmatrix},\begin{bmatrix}2 & 2\\2 & 3\end{bmatrix},\begin{bmatrix}3 & 3\\3 & 3\end{bmatrix},\begin{bmatrix}1 & 1\\1 & 1\end{bmatrix},\begin{bmatrix}1 & 1\\1 & 1\end{bmatrix},\begin{bmatrix}1 & 1\\3 & 3\end{bmatrix},\begin{bmatrix}3 & 3\\3 & 2\end{bmatrix},\begin{bmatrix}2 & 2\\2 & 2\end{bmatrix}\right].$$

The target feature matrix includes a three-dimensional matrix, that is, the three-dimensional matrix includes 15 two-dimensional matrices, and the number of rows and columns of each two-dimensional matrix is 2.

In this embodiment, when the initial weight matrix in the fully connected layer has four dimensions, by uniformly converting the dimension of the initial feature matrix to four dimensions, it can be ensured that the dimension of the target feature matrix input to the fully connected layer is the same as the dimension of the initial weight matrix.

Through the above embodiment, the dimension of the initial feature matrix is converted to being consistent with the dimension of the initial weight matrix, so that the target feature matrix can be directly multiplied by the initial weight matrix, so that the multiple two-dimensional matrices in the target feature matrix can be directly added to the operation. Since a number of parameters of each operation is increased, an operation speed of the fully connected layer can be improved.

108, the electronic device generates a target vector according to the target feature matrix and the initial weight matrix.

In at least one embodiment of the present disclosure, the generating of the target vector according to the target feature matrix and the initial weight matrix includes:

Obtaining the target vector by multiplying the target weight matrix and the target feature matrix.

109, the electronic device obtains a recognition result of the image to be recognized by inputting the target vector into the recognition layer.

In at least one embodiment of the present disclosure, the recognition layer refers to a function layer that classifies the target vector and outputs a classification result.

In at least one embodiment of the present disclosure, the recognition result refers to a predicted category of the image to be recognized predicted by the second recognition model. The recognition results may include categories such as Garfield, Teddy, and the like.

In at least one embodiment of the present disclosure, the obtaining of the recognition result of the image to be recognized by inputting the target vector into the recognition layer includes:

Inputting the target feature matrix into the recognition layer, and obtaining a plurality of predicted categories and a second probability corresponding to each of the plurality of predicted categories, and obtaining a third probability corresponding to a plurality of subcategories of each of the plurality of predicted categories; determining a category from the plurality of predicted categories corresponding to a largest second probability as a target category, and determining a subcategory from the plurality of subcategories of the target category corresponding to a largest third probability as the recognition result of the image to be recognized.

The subcategory refers to a more specific category of the object to be recognized based on the annotated category. For example, if the target category is a cat, the subcategories can be a puppet, Garfield, etc. If the target category is dog, the subcategories can be huskies, golden retrievers, teddy, etc. If the target category is flowers, the subcategories can be peonies, roses, white orchids, and so on.

The recognition layer may be a softmax function.

In this embodiment, the annotated categories of the plurality of test images should include enough categories and each annotated category should include enough subcategories, so that the target category is among the annotated categories.

By determining the subcategory from the plurality of subcategories of the target category corresponding to the largest third probability as the recognition result of the image to be recognized, more specific category information under the object to be recognized can be accurately obtained.

It can be seen from the above technical solutions that, the present disclosure can increase an amount of parameters involved in each operation, a speed of image recognition can be improved.

Figure 3:
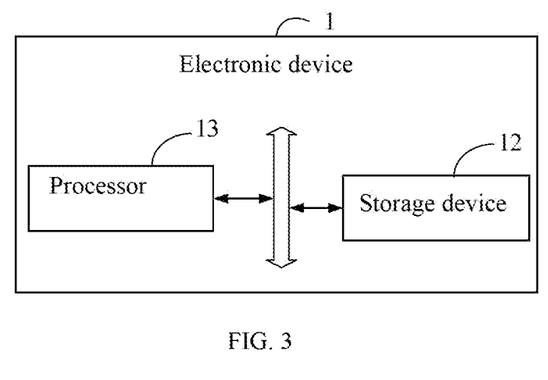
FIG. 3 is a schematic structural diagram of one embodiment of an electronic device of the present disclosure.

As shown in FIG. 3, it is a structural diagram of an electronic device according to one embodiment of the image recognition method of the present disclosure.

In an embodiment of the present disclosure, the electronic device 1 includes, but is not limited to, a storage device 12, a processor 13, and a computer program stored in the storage device 12 and can be executed by the processor 13. For example, the computer program can be a program of image recognition.

Those skilled in the art can understand that the schematic structural diagram is only an example of the electronic device 1, and does not constitute a limitation on the electronic device 1, and may include more or less components than the one shown, or combine some components, or different components, for example, the electronic device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The processor 13 is the computing core and control center of the electronic device 1, and uses various interfaces and lines to connect each part of the electronic device 1. For example, the processor 13 can obtain the image to be recognized captured by the capture device 2 through an interface.

The processor 13 obtains the operating system of the electronic device 1 and obtains various installed applications. The processor 13 obtains the application program to implement each block in the embodiments of the foregoing image recognition method, for example, to implement each block shown in FIG. 2.

Exemplarily, the computer program can be divided into one or more modules/units, and the one or more modules/units are stored in the storage device 12 and retrieved by the processor 13 to complete the present disclosure. The one or more modules/units may be a series of computer program instruction segments capable of performing specific functions, and the instruction segments are used to describe the process of acquisition the computer program in the electronic device 1.

The storage device 12 can be used to store the computer programs and/or modules, and the processor 13 executes or obtains the computer programs and/or modules stored in the storage device 12, and calls up the data stored in the storage device 12, such that various functions of the electronic device 1 are realized. The storage device 12 may mainly include an area for storing programs and an area for storing data, wherein the area for storing programs may store an operating system, an application program required for at least one function (such as a sound playback function, an image display function, etc.), and the like; the area for storing data may store the data created according to the use of the electronic device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the electronic device 1. Further, the storage device 12 may be a storage in physical form, such as a memory stick, a trans-flash card, and the like.

If the modules/units integrated in the electronic device 1 are implemented in the form of software functional units and sold or used as independent products, they may be stored in a computer-readable storage medium. Based on this understanding, the present disclosure can implement all or part of the processes in the methods of the above embodiments, and can also be completed by instructing the relevant hardware through a computer program. The computer program can be stored in a computer-readable storage medium, and when the computer program is acquired by the processor, the blocks of the foregoing method embodiments can be implemented.

Wherein, the computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 2, the storage device 12 in the electronic device 1 stores a plurality of instructions to implement the image recognition method, and the processor 13 can acquire the plurality of instructions to implement processes of: acquiring an image to be recognized, a plurality of test images, and annotated categories of the plurality of test images; obtaining a recognition region by performing a region detection on the image to be recognized, and obtaining a plurality of test regions by performing region detection process on each of the plurality of test images; obtaining a plurality of first prediction results by predicting each of the plurality of test regions using a first recognition model, and calculating a prediction accuracy rate of the first recognition model based on the plurality of first prediction results; determining a plurality of target regions from the plurality of test regions based on the plurality of first prediction results; obtaining a second recognition model by adjusting the first recognition model based on the prediction accuracy rate and the plurality of target regions, the second recognition model comprising an input layer, a fully connected layer, and a recognition layer; acquiring an initial feature matrix by inputting the recognition region in the input layer of the second recognition model; in response that a dimension of the initial feature matrix is less than a dimension of an initial weight matrix in the fully connected layer, obtaining a target feature matrix by raising a dimension of the initial feature matrix; generating a target vector according to the target feature matrix and the initial weight matrix; and obtaining a recognition result of the image to be recognized by inputting the target vector into the recognition layer.

Specifically, for the specific implementation method of the above-mentioned instruction by the processor 13, reference may be made to the description of the relevant blocks in the corresponding embodiment of FIG. 2, and details are not repeated.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. An image recognition method applied to an electronic device, the method comprising:
acquiring an image to be recognized, a plurality of test images, and annotated categories of the plurality of test images;
obtaining a recognition region by performing a region detection on the image to be recognized, and obtaining a plurality of test regions by performing the region detection on each of the plurality of test images;
obtaining a plurality of first prediction results by predicting each of the plurality of test regions using a first recognition model, and calculating a prediction accuracy rate of the first recognition model based on the plurality of first prediction results;
determining a plurality of target regions from the plurality of test regions based on the plurality of first prediction results;
obtaining a second recognition model by adjusting the first recognition model based on the prediction accuracy rate and the plurality of target regions, the second recognition model comprising an input layer, a fully connected layer, and a recognition layer;
acquiring an initial feature matrix by inputting the recognition region in the input layer of the second recognition model;
in response that a dimension of the initial feature matrix is less than a dimension of an initial weight matrix in the fully connected layer, obtaining a target feature matrix by raising a dimension of the initial feature matrix;
generating a target vector according to the target feature matrix and the initial weight matrix; and
obtaining a recognition result of the image to be recognized by inputting the target vector into the recognition layer.

2. The image recognition method according to claim 1, wherein the obtaining of the recognition region by performing the region detection on the image to be recognized comprises:
obtaining a characteristic image by performing an equalization and normalization processing on the image to be recognized;
obtaining a target position by detecting the characteristic image based on a target detection algorithm; and
obtaining the recognition region by segmenting the characteristic image based on the target position.

3. The image recognition method according to claim 1, further comprising:
acquiring a plurality of training images;
obtaining a plurality of training regions by detecting each of the plurality of training images; and
obtaining the first recognition model by performing an iterative training on a convolutional neural network based on the plurality of training regions.

4. The image recognition method according to claim 1, wherein each of the plurality of first prediction results comprises a predicted category of a corresponding test region, the calculating of the prediction accuracy rate of the first recognition model based on the plurality of first prediction results comprises:
obtaining a plurality of feature regions by determining each test region corresponding to a predicted category that is same as the annotated category as a feature region;
counting a first quantity of the plurality of feature regions and counting a second quantity of the plurality of test regions;
determining the prediction accuracy rate of the first recognition model by calculating a ratio of the plurality of feature regions in the plurality of test regions according to the first quantity and the second quantity.

5. The image recognition method according to claim 4, wherein each of the plurality of first prediction results further comprises a first probability of each predicted category, the determining of the plurality of target regions from the plurality of test regions based on the plurality of first prediction results comprises:
determining each test region of which the first probability greater than a preset threshold as the target region.

6. The image recognition method according to claim 1, wherein the obtaining of the second recognition model by adjusting the first recognition model based on the prediction accuracy rate and the plurality of target regions comprises:
counting a third total number of target areas that are corresponding to each annotated category;
obtaining a plurality of enhanced areas by performing data enhancement on the target areas corresponding to the third total number being less than a first preset value;
if the prediction accuracy rate is less than a second preset value, obtaining the second recognition model by inputting the plurality of enhanced regions into the first recognition model until the prediction accuracy rate is greater than or equal to the second preset value.

7. The image recognition method according to claim 1, wherein the obtaining of the target feature matrix by raising the dimension of the initial feature matrix comprises:
counting a number of rows of the initial feature matrix and counting a number of columns of the initial feature matrix;
obtaining a target product by multiplying the number of rows and the number of columns;
obtaining a plurality of prime factors by decomposing the target product;
combining any two same prime factors among the plurality of prime factors into a prime factor pair, and obtaining a plurality of prime factor pairs; obtaining a feature product by calculating a product of the two prime factors in each of the plurality of prime factor pairs, wherein each prime factor can only be combined once; selecting a plurality of target prime factor pairs from the plurality of prime factor pairs according to the target product and the feature product;
obtaining a characteristic prime factor by extracting a prime factor from each of the plurality of target prime factor pairs;
generating a characteristic value according to a logarithm of the plurality of target prime factor pairs and each characteristic prime factor; replacing each target prime factor pair with zero among the plurality of prime factors;
obtaining a target value by multiplying all non-zero prime factors after completing a replacement of replacing each target prime factor pair with zero; and
obtaining the target feature matrix by raising the dimension of the initial feature matrix based on a configuration value, the target value and the characteristic value.

8. The image recognition method according to claim 1, wherein the obtaining of the recognition result of the image to be recognized by inputting the target vector into the recognition layer comprises:

inputting the target feature matrix into the recognition layer, and obtaining a plurality of predicted categories and a second probability corresponding to each of the plurality of predicted categories, and obtaining a third probability corresponding to a plurality of subcategories of each of the plurality of predicted categories;

determining a category from the plurality of predicted categories corresponding to a largest second probability as a target category, and determining a subcategory from the plurality of subcategories of the target category corresponding to a largest third probability as the recognition result of the image to be recognized.

9. An electronic device comprising:

a storage device;

at least one processor; and the storage device storing one or more programs, which when executed by the at least one processor, cause the at least one processor to:

acquire an image to be recognized, a plurality of test images, and annotated categories of the plurality of test images;

obtain a recognition region by performing a region detection on the image to be recognized, and obtain a plurality of test regions by performing the region detection on each of the plurality of test images;

obtain a plurality of first prediction results by predicting each of the plurality of test regions using a first recognition model, and calculate a prediction accuracy rate of the first recognition model based on the plurality of first prediction results;

determine a plurality of target regions from the plurality of test regions based on the plurality of first prediction results;

obtain a second recognition model by adjusting the first recognition model based on the prediction accuracy rate and the plurality of target regions, the second recognition model comprising an input layer, a fully connected layer, and a recognition layer;

acquire an initial feature matrix by inputting the recognition region in the input layer of the second recognition model;

in response that a dimension of the initial feature matrix is less than a dimension of an initial weight matrix in the fully connected layer, obtain a target feature matrix by raising a dimension of the initial feature matrix;

generate a target vector according to the target feature matrix and the initial weight matrix; and obtain a recognition result of the image to be recognized by inputting the target vector into the recognition layer.

10. The electronic device according to claim 9, wherein the obtaining of the recognition region by performing the region detection on the image to be recognized comprises:

obtaining a characteristic image by performing an equalization and normalization processing on the image to be recognized;

obtaining a target position by detecting the characteristic image based on a target detection algorithm; and obtaining the recognition region by segmenting the characteristic image based on the target position.

11. The electronic device according to claim 9, wherein the at least one processor is further caused to:

acquire a plurality of training images;

obtain a plurality of training regions by detecting each of the plurality of training images; and obtain the first recognition model by performing an iterative training on a convolutional neural network based on the plurality of training regions.

12. The electronic device according to claim 9, wherein each of the plurality of first prediction results comprises a predicted category of a corresponding test region, the at least one processor calculates the prediction accuracy rate of the first recognition model based on the plurality of first prediction results by:

obtaining a plurality of feature regions by determining each test region corresponding to a predicted category that is same as the annotated category as a feature region;

counting a first quantity of the plurality of feature regions and counting a second quantity of the plurality of test regions;

determining the prediction accuracy rate of the first recognition model by calculating a ratio of the plurality of feature regions in the plurality of test regions according to the first quantity and the second quantity.

13. The electronic device according to claim 12, wherein each of the plurality of first prediction results further comprises a first probability of each predicted category, the at least one processor determines the plurality of target regions from the plurality of test regions based on the plurality of first prediction results by:

determining each test region of which the first probability greater than a preset threshold as the target region.

14. The electronic device according to claim 9, wherein the at least one processor obtains the second recognition model by adjusting the first recognition model based on the prediction accuracy rate and the plurality of target regions by:

counting a third total number of target areas that are corresponding to each annotated category;

obtaining a plurality of enhanced areas by performing data enhancement on the target areas corresponding to the third total number being less than a first preset value;

if the prediction accuracy rate is less than a second preset value, obtaining the second recognition model by inputting the plurality of enhanced regions into the first recognition model until the prediction accuracy rate is greater than or equal to the second preset value.

15. The electronic device according to claim 9, wherein the at least one processor obtains the target feature matrix by raising the dimension of the initial feature matrix by:

counting a number of rows of the initial feature matrix and counting a number of columns of the initial feature matrix;

obtaining a target product by multiplying the number of rows and the number of columns;

obtaining a plurality of prime factors by decomposing the target product;

combining any two same prime factors among the plurality of prime factors into a prime factor pair, and obtaining a plurality of prime factor pairs; obtaining a feature product by calculating a product of the two prime factors in each of the plurality of prime factor pairs, wherein each prime factor can only be combined once; selecting a plurality of target prime factor pairs from the plurality of prime factor pairs according to the target product and the feature product;

obtaining a characteristic prime factor by extracting a prime factor from each of the plurality of target prime factor pairs;

generating a characteristic value according to a logarithm of the plurality of target prime factor pairs and each characteristic prime factor; replacing each target prime factor pair with zero among the plurality of prime factors;

obtaining a target value by multiplying all non-zero prime factors after completing a replacement of replacing each target prime factor pair with zero; and obtaining the target feature matrix by raising the dimension of the initial feature matrix based on a configuration value, the target value and the characteristic value.

16. The electronic device according to claim 9, wherein the at least one processor obtains the recognition result of the image to be recognized by inputting the target vector into the recognition layer by:

inputting the target feature matrix into the recognition layer, and obtaining a plurality of predicted categories and a second probability corresponding to each of the plurality of predicted categories, and obtaining a third probability corresponding to a plurality of subcategories of each of the plurality of predicted categories;

determining a category from the plurality of predicted categories corresponding to a largest second probability as a target category, and determining a subcategory from the plurality of subcategories of the target category corresponding to a largest third probability as the recognition result of the image to be recognized.

17. A non-transitory storage medium having instructions stored thereon, when the instructions are executed by a processor of an electronic device, the processor is caused to perform an image recognition method, wherein the method comprises:

acquiring an image to be recognized, a plurality of test images, and annotated categories of the plurality of test images;

obtaining a recognition region by performing a region detection on the image to be recognized, and obtaining a plurality of test regions by performing the region detection on each of the plurality of test images;

obtaining a plurality of first prediction results by predicting each of the plurality of test regions using a first recognition model, and calculating a prediction accuracy rate of the first recognition model based on the plurality of first prediction results;

determining a plurality of target regions from the plurality of test regions based on the plurality of first prediction results;

obtaining a second recognition model by adjusting the first recognition model based on the prediction accuracy rate and the plurality of target regions, the second recognition model comprising an input layer, a fully connected layer, and a recognition layer;

acquiring an initial feature matrix by inputting the recognition region in the input layer of the second recognition model;

in response that a dimension of the initial feature matrix is less than a dimension of an initial weight matrix in the fully connected layer, obtaining a target feature matrix by raising a dimension of the initial feature matrix;

generating a target vector according to the target feature matrix and the initial weight matrix; and obtaining a recognition result of the image to be recognized by inputting the target vector into the recognition layer.

18. The non-transitory storage medium according to claim 17, wherein the obtaining of the recognition region by performing the region detection on the image to be recognized comprises:

obtaining a characteristic image by performing an equalization and normalization processing on the image to be recognized;

obtaining a target position by detecting the characteristic image based on a target detection algorithm; and obtaining the recognition region by segmenting the characteristic image based on the target position.

19. The non-transitory storage medium according to claim 17, further comprising:

acquiring a plurality of training images;

obtaining a plurality of training regions by detecting each of the plurality of training images; and obtaining the first recognition model by performing an iterative training on a convolutional neural network based on the plurality of training regions.

20. The non-transitory storage medium according to claim 17, wherein each of the plurality of first prediction results comprises a predicted category of a corresponding test region, the calculating of the prediction accuracy rate of the first recognition model based on the plurality of first prediction results comprises:

obtaining a plurality of feature regions by determining each test region corresponding to a predicted category that is same as the annotated category as a feature region;

counting a first quantity of the plurality of feature regions and counting a second quantity of the plurality of test regions;

determining the prediction accuracy rate of the first recognition model by calculating a ratio of the plurality of feature regions in the plurality of test regions according to the first quantity and the second quantity.

* * * * *